US008560498B2

(12) United States Patent
Allen et al.

(10) Patent No.: US 8,560,498 B2
(45) Date of Patent: Oct. 15, 2013

(54) PROPAGATE DELTA INFORMATION FROM AN ENTERPRISE INFORMATION SYSTEM

(75) Inventors: Corville O. Allen, Morrisville, NC (US); Sugandha Srikanteswaran, San Mateo, CA (US); Ranjana Kaur Tasser, Fremont, CA (US); Suraksha Vidyarthi, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 1489 days.

(21) Appl. No.: 11/284,467

(22) Filed: Nov. 22, 2005

(65) Prior Publication Data

US 2007/0130181 A1    Jun. 7, 2007

(51) Int. Cl.
*G06F 7/00* (2006.01)
*G06F 17/00* (2006.01)

(52) U.S. Cl.
USPC ........................................................ 707/625

(58) Field of Classification Search
USPC .................................. 707/101, 200, 624, 625
See application file for complete search history.

(56) References Cited

U.S. PATENT DOCUMENTS

| | | | | |
|---|---|---|---|---|
| 4,853,843 A * | 8/1989 | Ecklund | ......................... | 707/203 |
| 5,321,837 A | 6/1994 | Daniel et al. | ................... | 395/650 |
| 5,999,947 A * | 12/1999 | Zollinger et al. | ............. | 707/203 |
| 6,122,639 A * | 9/2000 | Babu et al. | ................. | 707/103 R |
| 6,321,236 B1 * | 11/2001 | Zollinger et al. | ............. | 707/203 |
| 6,341,279 B1 | 1/2002 | Nye | .................... | 707/3 |
| 6,421,667 B1 | 7/2002 | Codd et al. | .......................... | 707/4 |
| 6,484,159 B1 * | 11/2002 | Mumick et al. | .................... | 707/2 |
| 6,578,043 B2 | 6/2003 | Nye | ............................... | 707/102 |
| 6,617,969 B2 | 9/2003 | Tu et al. | ......................... | 340/517 |
| 6,665,654 B2 * | 12/2003 | Broden et al. | ..................... | 707/1 |

OTHER PUBLICATIONS

Shahram Ghandeharizadeh and Frank Sommers, A Case for Deltas in Business-to-Business Electronic Commerce, pp. 176-185, published 1999.*
Websphere Business Integration Information, How the Connector Works, found online at http://publib.boulder.ibm.com/infocenter/wbihelp/v6rxmx/index.jsptopic=/com.ibm.wbia_adapters.doc/doc/i2adw/i2adw21.htm, last updated Sep. 2005.*
An Intelligent Event Adaptation Mechanism for Business Performance Monitoring, Shiwa Fu, Trieu Chieu, Jih-Shyr Yih and Santhosh Kumaran, published Oct. 2005.*
Yalcin et al., "Event Propagation Conditions in Circuit Delay Computation", ACM Transactions on Design Automation of Electronic Systems, vol. 2, No. 3, Jul. 1997, pp. 249-280.
Wilson, "A Requirements and Design Aid for Relational Data Bases", IEEE 1981, pp. 283-293.

(Continued)

*Primary Examiner* — Jeffrey A Burke
(74) *Attorney, Agent, or Firm* — Yee & Associates, P.C.; Prentiss W. Johnson (57) ABSTRACT

Disclosed is a computer implemented method, computer program product, and data processing system for propagating object fields associated with an event to a client application. A software module gets an event having an event identifier, wherein the event identifier is associated with a business object. The software module analyzes the business object and the application specific metadata to determine the delta component used for the event. The software module builds the delta business object based on the delta content. The software module determines if the business object has a child object. The software module sets the business object to be the child object in response to a determination that the business object has the child object. The software module propagates the delta business object to the client application.

20 Claims, 7 Drawing Sheets

(56) References Cited

OTHER PUBLICATIONS

Carzaniga et al., "Design and Evaluation of a Wide-Area Event Notification Service", ACM Transactions on Computer Systems, vol. 19, No. 3, Aug. 2001, pp. 332-383.

Ghandeharizadeh et al., "Heraclitus: Elevating Deltas to be First-Class Citizens in a Database Programming Language", ACM Transactions on Database Systems, vol. 21, No. 3, Sep. 1996, pp. 370-426.

* cited by examiner

```
<Top Level Business Object>Product</Top Level Business Object>
          <AppInfo>  402
<ComponentName>Product</ComponentName>
<DeltaInfo>Delta_Product_Component</DeltaInfo>                    400
          </AppInfo>
     <Content>Product</Content>
          <Attribute>product_id</attribute>
          <attribute>description</attribute>
               <delta>old_description</delta>
          <Attribute>product_name</attribute>
               <delta>old_product_name</delta>
          <attribute>category_id</attribute>
               <delta>old_category_id</delta>
          404
     <ChildContainment>Parts</ChildContainment>
     <AppInfo>
          <ComponentName>Parts</ComponentName>
          <DeltaInfo>Delta_Parts_Component</DeltaInfo>
     </AppInfo>
     <Content>Part</Content>
          <attribute>part_id</attribute>
          <attribute>product_id<attribute>
          <attribute>part_number</attribute>
               <delta>old_part_number</delta>
          <attribute>quantity</attribute>
               <delta>old_quantity</delta>
          <attribute>code</attribute>
               <delta>old_code</delta>
```

FIG. 4B

```
<Top Level Business Object>Product</Top Level Business Object>                 420
         <AppInfo>   422
<ComponentName>Bicycle</ComponentName>
<DeltaInfo>Delta_Bicycle_Component</DeltaInfo>
         </AppInfo>          424
     <Content>"bicycle"</Content>
         <Attribute>bicycle_id</attribute>
         <attribute>description</attribute>
         <delta>old_description</delta>
                    426
<ChildContainment>Bicycle Wheels</ChildContainment>
         <AppInfo>           428
         <ComponentName>"bicycle_wheel"</ComponentName>
         <DeltaInfo>Delta_bicycle_Wheels_Component</DeltaInfo>
         </AppInfo>    432             430
     <Content>"bicycle wheel"</Content> 434
              <attribute>wheel_id</attribute>  436
              <attribute>wheel_size</attribute>       438
                  <delta>old_wheel_size</delta>
              <attribute>wheel_type</attribute>
                  <delta>old_wheel_type</delta>
```
                                                                        425

FIG. 4C

```
<Top Level Business Object>Bicycle</Top Level Business Object>
         <AppInfo>
<ComponentName>Bicycle</ComponentName>
<DeltaInfo>Delta_Bicycle_Component</DeltaInfo>
         </AppInfo>
     <Content>Bicycle</Content>   456
         <Attribute>k25</attribute>     454
         <attribute>Rally Sport</attribute>
              <delta>Sport Bike</delta>
                      452
<ChildContainment>Bicycle Wheels</ChildContainment>
         <AppInfo>
              <ComponentName>bicycle_wheel</ComponentName>
              <DeltaInfo>Delta_bicycle_wheel_Component</DeltaInfo>
         </AppInfo>
         <Content>bicycle wheel</Content>
              <attribute>993</attribute>    458
              <attribute>13 inches</attribute>
                  <delta></delta>    460
              <attribute>rubber</attribute>
                  <delta></delta>
```

FIG. 4D

```
<Top Level Business Object>Bicycle</Top Level Business Object>
            <AppInfo>
<ComponentName>Bicycle</ComponentName>
<DeltaInfo>Delta_Bicycle_Component</DeltaInfo>
            </AppInfo>
        <Content>Bicycle</Content>
            <Attribute>k25</attribute>    484
            <attribute>Rally Dirt Bike</attribute>
                <delta>Rally Sport</delta>
                            482
    <ChildContainment>Bicycle Wheels</ChildContainment>
        <AppInfo>
                <ComponentName>bicycle_wheel</ComponentName>
                <DeltaInfo>Delta_bicycle_wheel_Component</DeltaInfo>
        </AppInfo>
        <Content>bicycle wheel</Content>
            <attribute>993</attribute>    488
            <attribute>14 inches</attribute>  486
                <delta>13inches</delta>
            <attribute>rubber</attribute>
                <delta></delta>
```

PROPAGATE DELTA INFORMATION FROM AN ENTERPRISE INFORMATION SYSTEM

BACKGROUND OF THE INVENTION

1. Field of the Invention

The present invention relates generally to collecting events for a distributed database. More specifically, the present invention is related to a computer implemented method, computer program product, and data processing system for providing representation of data objects at various hierarchical levels as they change due to events from an Enterprise Information System (EIS).

2. Description of the Related Art

Database developers and developers of data structures, in general, organize and manage information in a hierarchical manner. Developers assemble smaller and simpler pieces of information to represent larger and more complex pieces of information. For example, a complex piece of information representing a bicycle may comprise smaller and less complex pieces of information about a wheel, a seat, a handle, and a pedal. A developer may represent a wheel by assembling or interrelating even smaller and simpler information about a rim, spoke, tire, axle, and so on. Developers call such compositions of information business objects, wherein the objects are generally organized in such a way that they represent business data. Developers create data structures to relate each object in parent-child relationships; for example, a bicycle object would be a parent of the wheel, seat, handle, and pedal objects. The wheel, seat, handle, and pedal objects are each a child of the parent object, in this case, the bicycle object. A wheel object could in turn be the parent object for rim, spoke, tire, and axle child objects. Once a developer creates such data object relationships, software applications can read, write, and otherwise manipulate these objects depending on their needs. For example, a software application for managing inventory of wheel components for wheel manufacturing might reference the wheel object as a top-level object of interest. On the other hand, a software application for managing inventory of bicycle components for bicycle manufacturing might reference the bicycle object as a top-level object of interest. Depending on a developer's focus, the database and data structures within an Enterprise Information System may have to provide varying quantities and organization of information.

Further, the information stored in this manner changes constantly due to a variety of impetus, called events. Events occur proactively, interactively, inherently, or automatically, because of the activities transacting between applications, users, and data structures. Due to such events, changes occur to the data object hierarchies, which are important and meaningful to track. A bicycle manufacturer may use a distributed database to manage inventory. An event may be, for example, a bicycle receiving the final part on an assembly line. Thus, the parts used in building the bicycle will have directly altered the current inventory of the bicycle components. Information about old and new levels of inventory might be important for ensuring adequate supplies of parts.

Present passive database systems, while providing ways for tracking the changes to the information, do not provide ways to track such changes in relation to the events that caused them. In addition, such systems do not provide the change information organized in meaningful relationships that exist between the changed data objects. In the bicycle manufacturing example, it may be important to know not only the changed inventory levels of wheels after an hour of manufacturing, but also those of pedals and spokes in the event the bicycle manufacturing was interrupted for some reason in that particular hour of manufacturing bicycles.

In addition, it is presently unknown for enterprise information systems controlled by a vendor to integrate with an enterprise information system of a consumer such that changes in the former are propagated as changes or deltas represented in client objects.

SUMMARY OF THE INVENTION

The aspects of the present invention provide a computer implemented method, computer program product, and data processing system for managing data. A software module detects an event to form a detected event. The software module retrieves a hierarchy of objects based on the at least one component of interest. A change table associates the detected event and the at least one component of interest.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment of the present invention when read in conjunction with the accompanying drawings, wherein:

FIG. 4B shows a representative class of a delta business object in accordance with an illustrative embodiment of the present invention;

FIG. 4C shows an initial extensible markup language representation of an object ready for propagation in accordance with an illustrative embodiment of the present invention;

DETAILED DESCRIPTION OF THE PREFERRED EMBODIMENT

Figure 1:
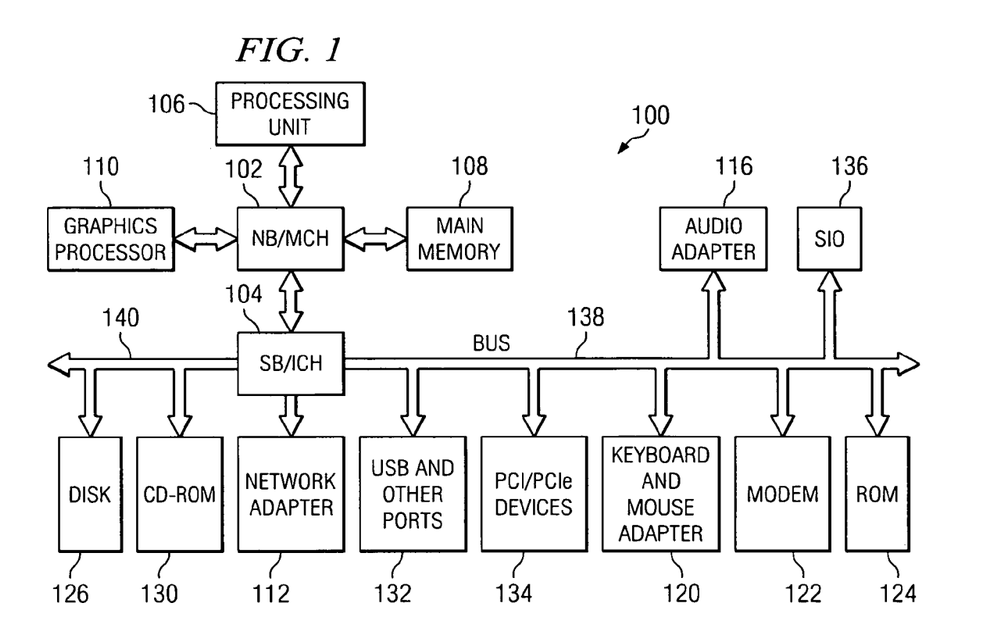
FIG. 1 shows a block diagram of a data processing system in accordance with an illustrative embodiment of the present invention.

With reference now to FIG. 1, a block diagram of a data processing system is shown in which embodiments of the present invention may be implemented. In the depicted example, data processing system 100 employs a hub architecture including north bridge and memory controller hub (NB/MCH) 108 and south bridge and input/output (I/O) controller hub (SB/ICH) 110. Processing unit 102, main memory 104, and graphics processor 118 connect to north bridge and memory controller hub 108. Graphics processor 118 may connect to north bridge and memory controller hub 108 through an accelerated graphics port (AGP).

In the depicted example, local area network (LAN) adapter 112, audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 110 through bus 138. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

Hard disk drive 126 and CD-ROM drive 130 connect to south bridge and I/O controller hub 110 through bus 140. Hard disk drive 126 and CD-ROM drive 130 may use, for example, an integrated drive electronics (IDE) or serial advanced technology attachment (SATA) interface. Super I/O (SIO) device 136 may be connected to south bridge and I/O controller hub 110.

The illustrative embodiments of the present invention retrieves a hierarchy of objects from a root object referred to in a change table, sometimes referred to as a main event table or as a main event component.

The illustrative embodiments of the present invention retrieves a hierarchy of objects from a root object referred to in main event component. This main event component is a data structure that records an event and its relationship to other data structures, for example, top-level component object 300 of FIG. 3A. The data structure may take different forms, such as, for example, a table. When in the form of a table the main event component is called a change table or a main event table. A main event component is a data structure that is used to record, for a time, the details concerning an event. This data structure may take many forms, such as for example a main event table. The main event table is a data structure that organizes data in a series of rows, often indexed by a unique identifier. In the example of a main event table form of a main event component, the index or key is in the form of a unique event identifier. Developers may organize the hierarchy of objects within a database or within an enterprise information system. A database may be a part of an enterprise information system. However, a database is not a required component of an enterprise information system.

One illustrative embodiment of the present invention maintains some aspects of the source objects and reproduces them in a delta business object. A delta business object is a data structure that shows changes that occur in the data structure of an enterprise information system. Such changes may include a change in a top-level object, and a change in a child object, if any. However, substantive data is not reproduced to the extent that the substantive data remains unchanged in the source object or objects by the event. Metadata is data about data. Substantive data is any data that is not metadata.

Thus, a reference to a parent or child object would be metadata, whereas, contents of an object, for example, an attribute such as "bicycle wheel" is substantive data. Later, an embodiment sends the delta business object to a client application. Thus, one or more illustrative embodiments of the present invention may provide a way to propagate, in an efficient manner, the aspects of a source database that have changed. Such propagation may communicate to a client on a separate enterprise information system (EIS) how source data has changed and affects the separate enterprise information system.

Figure 2:
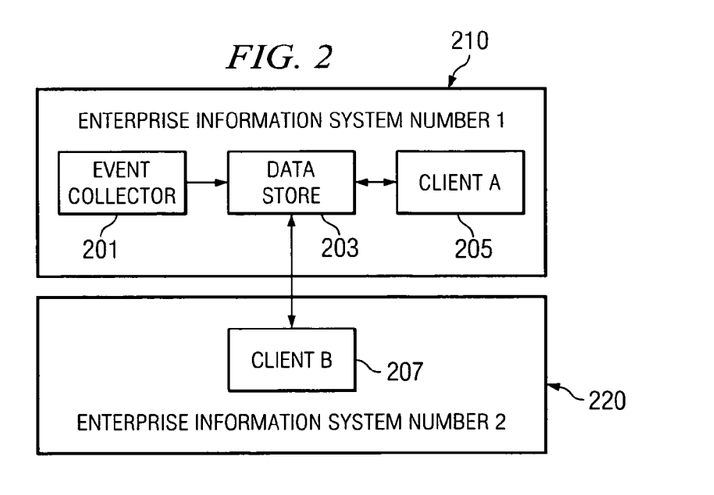
FIG. 2 shows a block diagram of devices coupled to an embodiment in accordance with an illustrative embodiment of the present invention.

FIG. 2 shows a block diagram of devices coupled to an embodiment in accordance with an illustrative embodiment of the present invention. Enterprise information system #1 210 may be, for example, a data processing system, such as data processing system 100 in FIG. 1. Alternatively, enterprise information system #1 210 may be comprised of multiple data processing systems, such as three or more data processing systems corresponding to event collector 201, software module 203, and client A 205. In either event, event collector 201, software module 203, and client A 205 may communicate, for example, through network connections. Client A 205 may be a relational database, such as DB2®, a trademark product of International Business Machines Corporation. Event collector 201 may monitor fields of objects to signal an event occurrence to software module 203.

An object is a data set with a collection of fields, or representation of a set of data. An event is a) the occurrence of changed data in a data processing system; or b) a state change. Events may be recurring, for example, at a particular time of day. An event includes the occurrence of a change to an object, for example, a business object. A business object maps a short column name to a customer name, that is, one that is more meaningful to a human reader. For example, a column may be named X_ID by a software developer or otherwise picked by default. A business object may map a more meaningful term, "bicycle_id" to that column.

Software module 203 may, based on such a signal, collect and transform data of client A 205 to form an object amenable for transmittal beyond enterprise information system #1 210. Software module 203 may communicate to client B 207 a delta business object. Client B 207 may be an enterprise information system, for example, Seibel, or that of a different enterprise information system maker.

A vendor, for example, a bicycle wheel vendor, owns or controls enterprise information system 210. In this example, a customer is a bicycle manufacturer that owns or controls enterprise information system #2 220.

Figure 3A:
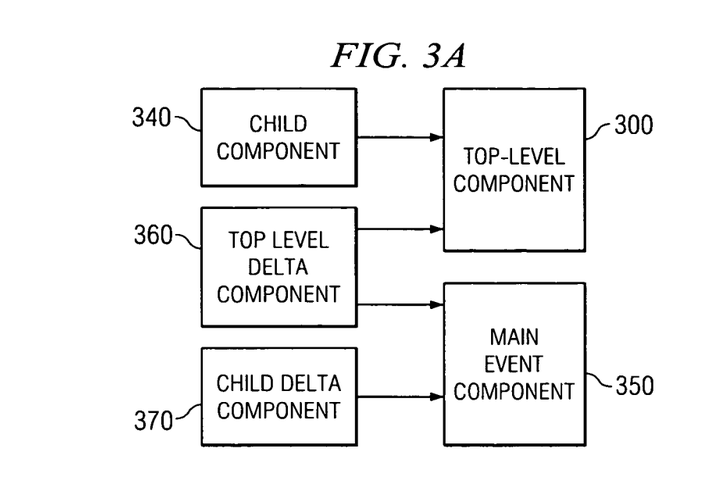
FIG. 3A shows a hierarchy of business objects in accordance with an illustrative embodiment of the present invention.

FIG. 3A shows a hierarchy of business objects in accordance with an illustrative embodiment of the present invention. Continuing with the bicycle wheel vendor and the bicycle manufacturer example, the objects shown in FIG. 3A are stored in, for example, client A 205 of FIG. 2. The business objects include top-level component 300 and child component 340, which together form a hierarchy of objects. Top-level component 300 and child component 340 are sometimes called business objects.

In the illustrative examples, a business object is an object hosted by an enterprise information system that has at least one data field, and may include references to one or more child objects. A child object is an object that has a direct or indirect relationship to a business object. The child object has one or more fields where details of a parent object or business object may be stored at a lower level than that of the parent object or business object. A child object may serve to hide or compactly store data that may not be relevant to operations that occur within the parent object. In these examples, a field is a storage location for data of a particular type. The data may or may not be validity checked prior to storage or revision within the field. Examples of fields include part names, inventory counts, statuses, and references to an object, among other things.

Top-level delta component 360 stores changed values and old values corresponding to all values that changed in top-level component 300, wherein the changes to top-level component 300 were responsive to the event. Child delta component 370 stores changed values and old values corresponding to all values that changed in child component 340, wherein the changes to child component 340 were responsive to the event.

Figure 3B:
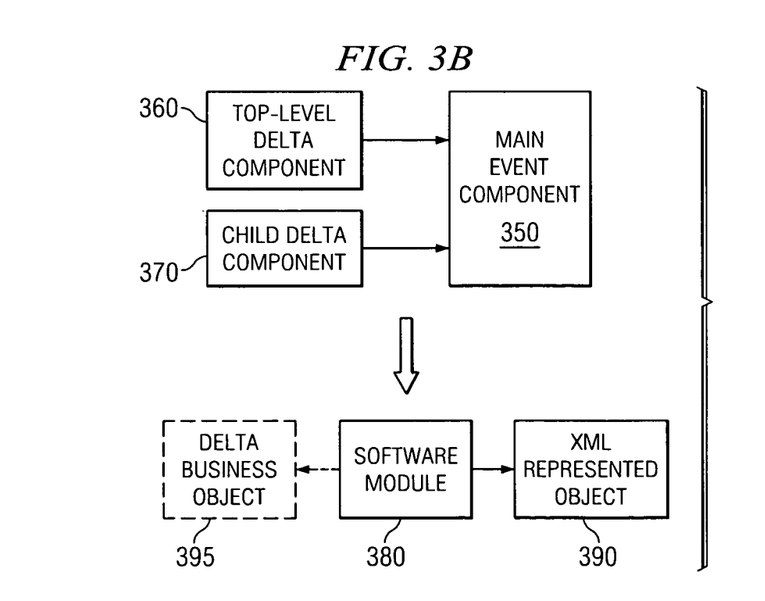
FIG. 3B shows a transformation of business objects of an enterprise information system in accordance with an illustrative embodiment of the present invention.

FIG. 3B shows a transformation of business objects of an enterprise information system in accordance with an illustrative embodiment of the present invention. Software module 380 may respond to the occurrence of an event. Software module 380 may operate and be stored on a data processing system, for example, data processing system 100 of FIG. 1. Software module 380 is software that operates as software module 203 of FIG. 2. Software module may operate using aspects of an operating system to accomplish low level functions.

In these examples, an event is a change or update made to a field within a business object, for example, changing a part description in an attribute field of the business object. An event may be directly driven by user entries at a keyboard or other user interface. An event may be more automatically generated by machine reading labels on factory assemblies or parts such that, for example, inventory and status information may be routinely updated, in for example, a factory environment. A process such as one receiving label inputs, may record an event to main event component 350, also known as a change table. A main event component is a data structure that is used to record, for a time, the details concerning an event. This data structure may take many forms, such as for example a main event table. The main event table is a data structure that organizes data in a series of rows, often indexed by a unique identifier. In the example of a main event table form of a main event component, the index or key is in the form of a unique event identifier. Software module 380 may collect, search or otherwise traverse the business objects, main event component 350 and one or more related objects, for example, top-level delta component 360 and child delta component 370.

Software module 380 responds by building a delta business object, for example, extensible markup language (XML) represented object 390, which is a form of delta business object. A delta business object is an object created by an illustrative embodiment of the present invention that includes extensible markup language delimiters around at least one field changed by an event. The embodiments create a delta business object that has insufficient data fields to represent a business object and all hierarchically subordinate objects. The only exception to the limited representation is that the delta business object may represent all data fields when an event changes all fields of the business object and hierarchically subordinate objects.

An alternative output may be to form a service data object based delta business object 395. A delta business object conforms to a service data object if the delta business object meets the specifications set in Java™ Specification Requests (JSR), as established and revised by Java™ Community Process. Java is a trademark of Sun Microsystems, Inc.

A component of interest includes the top-level business object referred to with a common event identifier as it appears in the main event component. A unique event identifier is an identifier that uniquely identifies objects or components affected by an event for a reasonable time. Since several objects, for example a parent object and a child object, may be affected by the same event, each object so affected will have the same unique event identifier. When two objects have the same unique event identifier, those objects have a common event identifier. In practice, this means that two instances of the same identifier are located, one each, within the data structure of each object. Other top-level business objects may exist within data processing system, however only one may have the common event identifier. If the top-level business object is associated with a child object, wherein the child object is affected by a change driven by an event, then the child object is also a component of interest. The delta business object may be a result of a process that retrieves at least one component of interest.

Figure 4A:
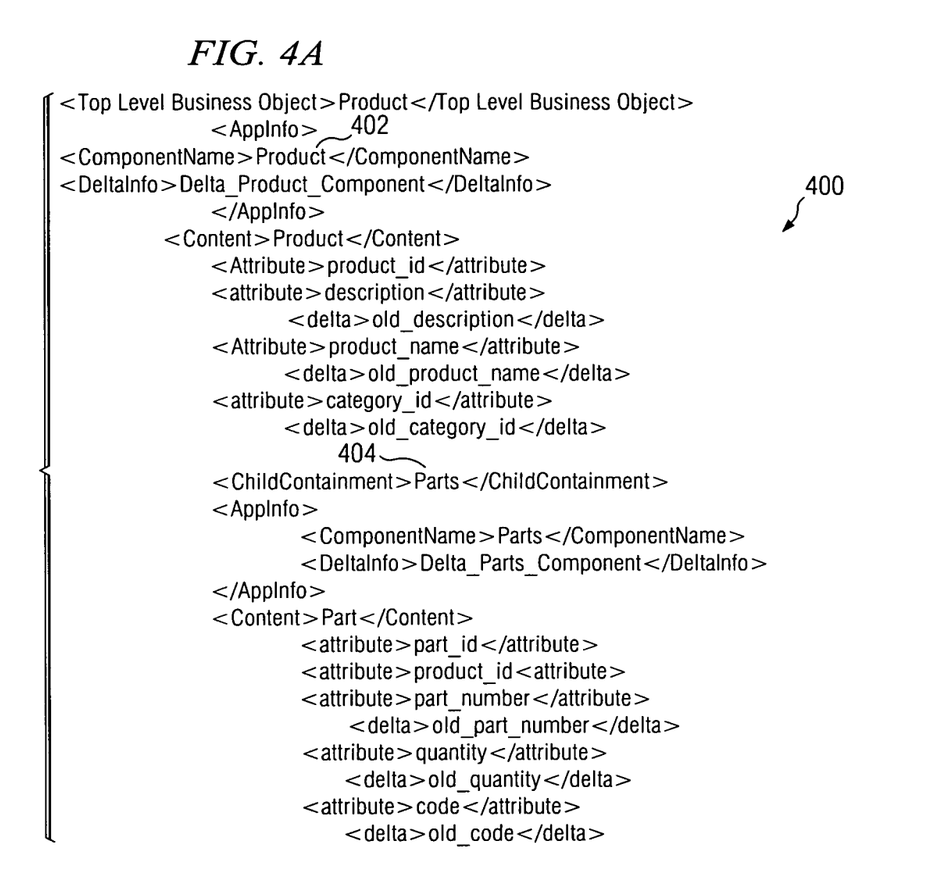
FIG. 4A shows a broad representation of a generic delta business object in accordance with an illustrative embodiment of the present invention.

FIG. 4A shows a sample delta business object in accordance with an illustrative embodiment of the present invention. Sample delta business object 400 is comprised of extensible markup language triplets. A triplet is comprised of a lead delimiter, a content, and a end delimiter. For example, the content "product" 402 is bounded by lead delimiter <ComponentName>, and an end delimiter </ComponentName>. The content itself may be one or more triplets. For example, a portion of sample delta business object 400 is known as application specific information. The lead delimiter and the tail delimiter for application specific information are <AppInfo> and </Appinfo>, respectively. Enclosed between these delimiters is content: <ComponentName>Product</Component><DeltaInfo>Delta_Produc t_Component</DeltaInfo>. A delta field is a pair of extensible markup language delimited strings. A delta field value is a string delimited by, for example, extended markup language tags that include the word "delta". A delta field value is the value for an element that represents a delta field. The first delimited string is the present field setting, for example, "thirteen inch" which may be an attribute related to bicycle wheel size. The second delimited string is the delta field, for example, "fourteen inch". In this example, the former wheel size had been fourteen inches, and the present field setting is thirteen inches. A delta field delimited by strings including the word "delta" includes a string which may represent an older or prior field setting of the attribute. The delta field is associated with delimiters, wherein the string "delta" is a part of each delimiter. The delta field may optionally be associated with extensible markup language delimited strings that define relationships among data within the delta business object. For example, "parts" 404 is between <ChildContainment> and </ChildContainment>. "Parts" 404 identifies the additional detail that follows as being a sub-part of data described earlier in the delta business object. FIG. 4A shows each field with highly generic labels indicating a broad class of applicable field names.

FIG. 4B shows an exemplary delta business object in accordance with an illustrative embodiment of the present invention using somewhat less generic labels for each field. Changed wheel delta business object 420 is an example of a delta business object that an embodiment of the present invention may generate in response to an event where wheel size and type change in accordance with an event. Changed wheel delta business object 420 may be an outcome generated as extensible markup language (XML) represented object 390 of FIG. 3B.

The content of changed wheel delta business object 420 shows the application specific information includes a component that is "bicycle" 422 and that the changing aspect is "delta_bicycle_component" 424. Subordinate to the overall "product" is a subsection of a part type established with the string, "bicycle wheels" 426. An embodiment of the present invention may generate the contents of child section 425 responsive to a child component, for example, child component 340 of FIG. 3A. The extensible markup language following the line containing "bicycle wheels" 426 denotes information specific to parts. Parts includes application specific information, including, "bicycle wheel" 428, and "delta_bicycle_wheels_component" 430. Content includes "bicycle wheel" 432. Content is made up of fields "wheel_id" 434, and "wheel_size" 436. The content enclosed by extensible markup language having the string "delta" denotes the content that has been changed by the event. For example, an extensible markup language triplet is comprised of <delta>; "old_wheel_size" 438; and </delta>.

FIG. 4C shows an initial extensible markup language representation of object ready for propagation following a first event. FIG. 4C uses specific examples for each field that correspond to the extensible markup language representation of object ready for propagation of FIG. 4B. Therein is shown a change from a bicycle attribute of "Sport Bike" 452 to a bicycle attribute of "Rally Sport" 454, wherein the attribute that changes is a bicycle_id type of attribute, such as "k25" 456. In addition, attributes concerning a wheel remain unchanged, that is, "13 inches" 458 and "rubber" 460.

Figure 4D:
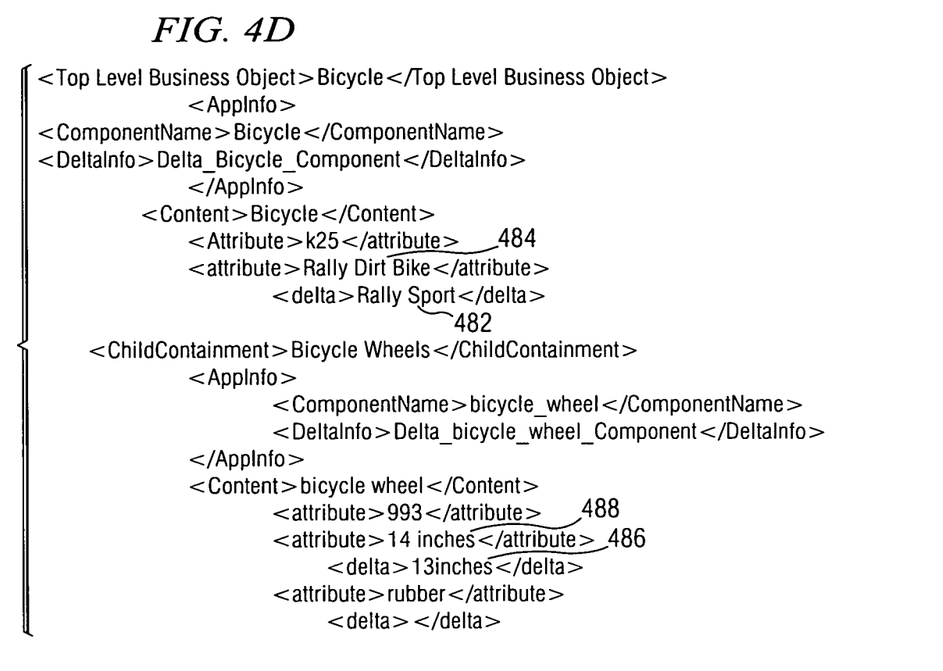
FIG. 4D shows an extensible markup language representation of an object ready for propagation in accordance with an illustrative embodiment of the present invention.

FIG. 4D shows an extensible markup language representation of object ready for propagation following a second event, wherein the extensible markup language representation of object ready for propagation is generated based upon changes made to the same business objects from which FIG. 4C derives. FIG. 4D uses specific examples for each field. Therein is shown a change from a bicycle attribute of "Rally Sport" 482 to a bicycle attribute of "Rally Dirt Bike" 484. In addition, attributes concerning a wheel change, that is, wheel size changes from "13 inches" 486 to "14 inches" 488.

FIG. 4C and FIG. 4D are examples of extensible markup language representation of object ready for propagation described by FIG. 4A and more specifically in FIG. 4B. It is appreciated that FIG. 4C is merely an example of a change formed into an extensible markup language representation of object ready for propagation that conforms to a class of business objects concerning bicycles. It will also be appreciated that FIG. 4A represents merely a broad class, of a still broader class of extensible markup language representation of object ready for propagation, as may be appreciated that a component may also be a service, with attendant fields more narrowly defining the particular instance of service. It is appreciated that fewer fields or more fields may comprise a top-level business object than shown in the illustrative embodiments of the present invention.

Figure 5A:
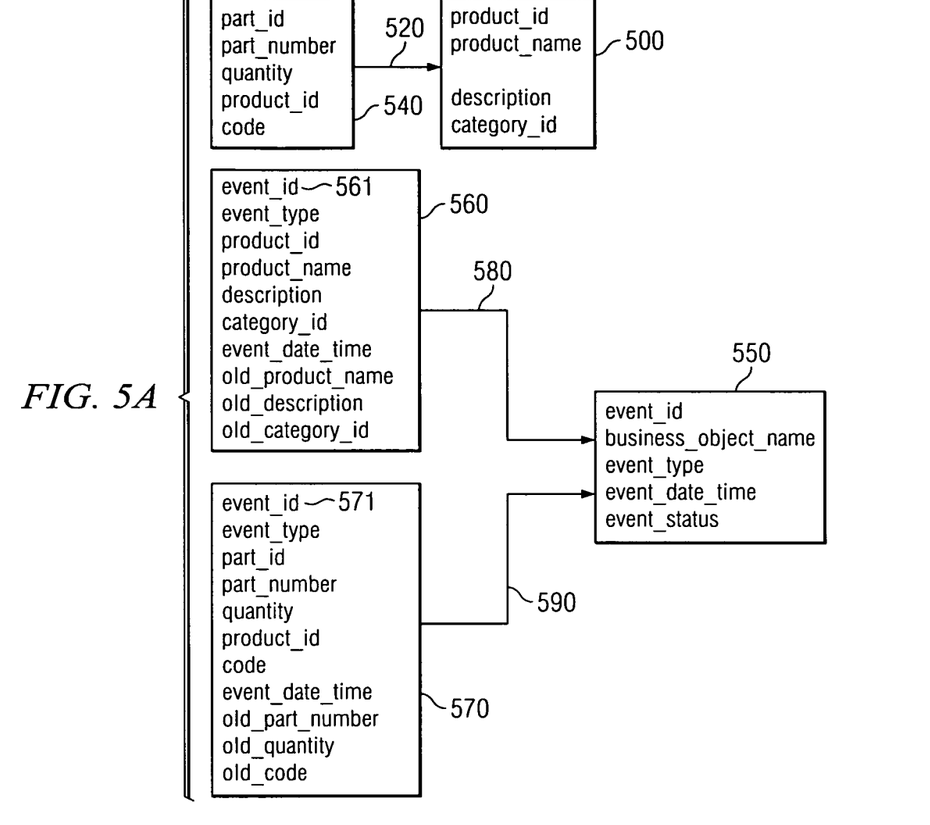
FIG. 5A shows details of data and their relationships stored in an enterprise information system or database in accordance with an illustrative embodiment of the present invention.

FIG. 5A shows details of generic business objects of an enterprise information system in accordance with an illustrative embodiment of the present invention. Child business object 540 is related to top-level business object 500 via a common product_id field that establishes the parent-child relationship 520. Event table 550, also known as a change table, has a relationship with delta component product change table 560 denoted by product relationship 580. Event table 550 has a relationship with delta component part change table 570 denoted by part relationship 590. Together, event table 550, delta component product change table 560, and delta component part change table 570 comprise a set of event tables. The relationships to event table 550 is based on a common event_id among objects 550, 560, and 570 through delta component product change table event_id 561 and delta component part change table event_id 571. Alternatively, the relationships may be established and traversed through the use of pointers. When a software module searches and locates business objects that share the common event_id 571 with event table, the software module is associating the detected event with one or more components of interest, that is, with the business object. A detected event is the result that occurs after an input is received that requests a change to a data structure and the event is recorded to the main event component with a unique event identifier.

Delta component product change table 560 and delta component part change table 570 may, in turn, be related to top-level business object 500 through a common product_id key field.

Figure 5B:
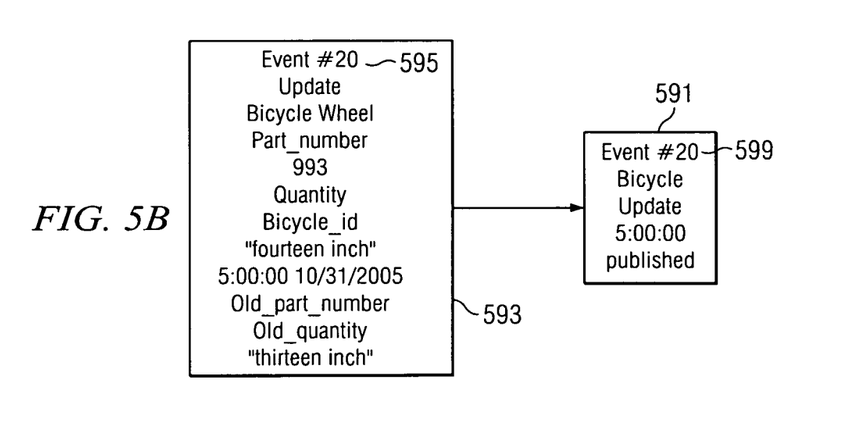
FIG. 5B shows details of exemplary bicycle data of an enterprise information system in accordance with an illustrative embodiment of the present invention.

FIG. 5B shows details of exemplary business objects of an enterprise information system in accordance with an illustrative embodiment of the present invention. Business objects include event table 591. Event table 591 is associated with delta component part change table 593. The association is established by first instance of event #20 595, being identical to second instance of event #20 599.

Figure 6:
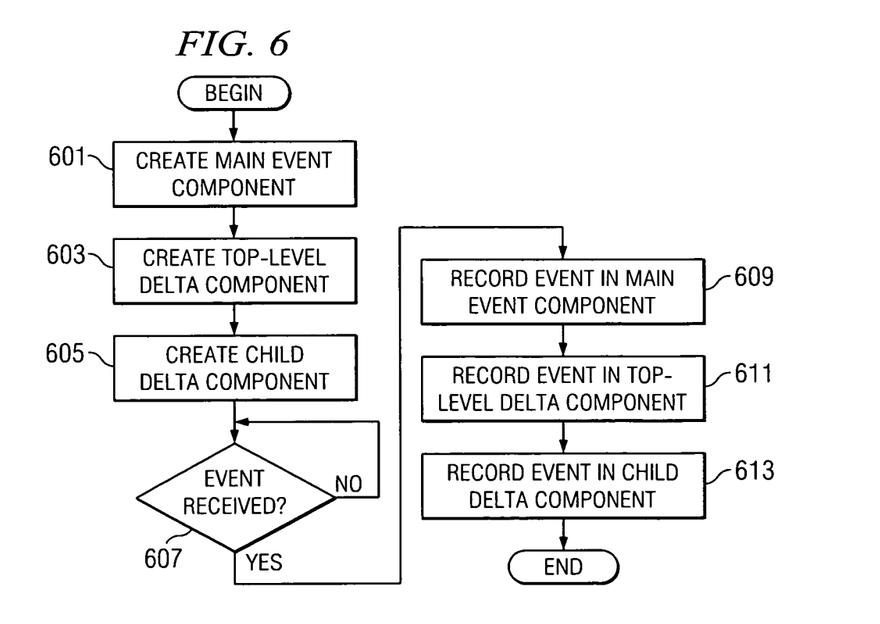
FIG. 6 shows a flowchart of maintaining an event table in accordance with an illustrative embodiment of the present invention.

FIG. 6 shows a flowchart of maintaining an event table in accordance with an illustrative embodiment of the present invention. Event collector 201, of FIG. 2, may perform steps illustrated in FIG. 6 in these examples. Event collector creates the main event component (step 601). Main event component may be a table with fields, for example, main event component 350 of FIG. 3A. In this illustrative example, the main event component is an event table because the data structure is in the form of a table. The table has an event_id, business_object_name, event_type, and event_status. Event collector creates top-level delta component, for example, top-level delta component 360 (step 603). Event collector may create one or more child delta components, for example, child delta component 370 (step 605). In addition, event collector may create child delta components that are, themselves, child components to previously created child delta components. Top-level component 360 and child delta component 370 are found in FIG. 3A. Event collector enters a loop, repeatedly determining whether an event has occurred and been received (step 607). A positive determination results in event collector recording event in the main event component (step 609). Recording the event includes event collector obtaining a unique identifier to form an event_id that may be generated from a limited space of unique identifiers. The identifier is unique in the sense that for the particular event collector, for a reasonable time longer than the event_id is projected to ever be useful, the set of unique identifiers are not exhausted. After such reasonable time, an event_id may be re-used. Following step 609, event collector may also record delta field values in a top-level delta component (step 611). If there are delta field values affecting one or more child delta components, event collector records the delta field values in the child delta components (step 613). Event collector may maintain main event component by performing steps 601, 603, and 605 upon an initialization phase. Following the first event, event collector may maintain by performing only steps 607 through 613, wherein later executions of the steps of FIG. 6 may begin at step 607.

Figure 7:
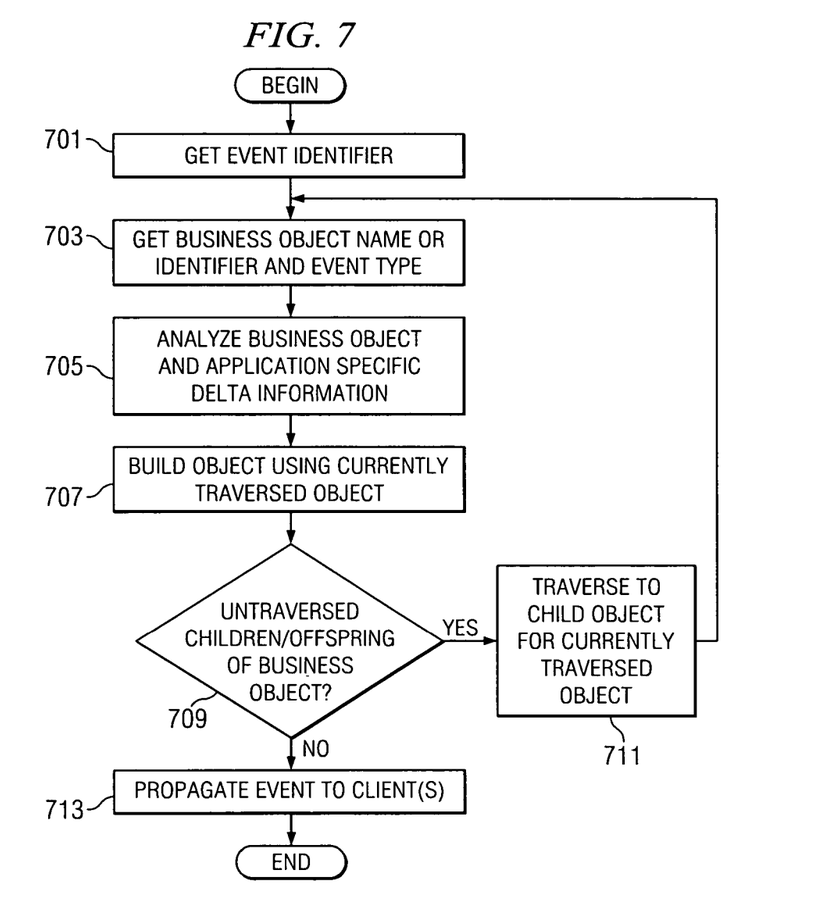
FIG. 7 shows a flowchart in accordance with an illustrative embodiment of the present invention.

FIG. 7 shows a flowchart in accordance with an illustrative embodiment of the present invention. The conclusion of steps in FIG. 7 may result in resuming steps of FIG. 6, and in particular, beginning at step 607. A software module, such as software module 203 of FIG. 2, may perform the steps of FIG. 7. Software module may reference objects found in FIG. 5A, for example. Event collector 201 of FIG. 2 may continuously monitor client A 205 of FIG. 2 such that changes to data fields are detected and reported to software module. Detecting an event may include software module 203 receiving a signal concerning the event. The software module receives a signal that an event occurred (step 701). This signal includes an encoded event identifier or other pointer to an event table, such as event table 550 of FIG. 5A. Event table, in turn, references a top-level business object using business_object_name 553, identifying the hierarchy of objects sourced at a root node, for example, top-level business object 500 of FIG. 5A. Software module receives an event having an event identifier and an event type (step 703). The event may be described, for example, in event table 550 having event identifier 551 of FIG. 5A, wherein the event is associated with a top-level business object.

The software module analyzes the business object associated with the event by recording application specific delta information (step 705). Application specific delta information is metadata that describes the relationship between objects. For example, top-level business object 500 of FIG. 5A may represent a bicycle business object. Software module may find a reference to delta component product change table based on the common product_id of both the top-level business object 500 and delta component product change table 560. Recording includes storing information to a storage device, such as, for example, main memory 108 of FIG. 1.

The business object associated with the event found in event table 550 of FIG. 5A is top-level business object 500. For example, top-level business object 500 of FIG. 5A may be referenced by business_object_name 553. Software module 203 of FIG. 2 builds the delta business object using the currently traversed business object (step 707). The currently traversed business object is top-level business object 500 of FIG. 5A. Thus, software module 203 of FIG. 2 may build, with each pass of step 707, a portion of a delta business object. The delta business object now built, may include some lines of exemplary delta business object 450 of FIG. 4B. Building may include looking up the attribute, bicycle_id, from delta component product change table 560, wherein bicycle_id is a reference obtained from top-level business object 500.

Software module 203 of FIG. 2 determines if the business object has a child object (step 709). In this case, top-level business object 500 of FIG. 5A has a child object, for example, child object 540. In step 709, the software module determines by examining business object 500 to see if a relationship is recorded to another object. Software module detects relationship 520 and finds the child object "wheel" 540. Software module 203 of FIG. 2 sets the business object to be the child object (step 711). Thus, the business object is set to be one level deeper into the hierarchy of objects for as long as child objects and other hierarchical levels remain untraversed.

The business object has a name "bicycle wheel". Software module 203 of FIG. 2 may continue using child object 540 of FIG. 5A as the business object while processing a second time through steps 703, 705, and 707, wherein software module 203 writes the remainder of delta business object 420 of FIG. 4B to form the complete delta business object. Software module 203 of FIG. 2 again determines if there is a child object to the current business object (step 709). Now, the determination is negative, with relation to child object 540 of FIG. 5A.

Software module 203 of FIG. 2 propagates the event in the form of delta business object 420 of FIG. 4B to the client application (step 713). Propagating may include transmitting the delta business object in secure hypertext transfer protocol format. Propagating may include transmitting the delta business object in an encrypted electronic mail. In addition, propagating may be over a Javaw™ Messaging Service transport. In addition, client may be sent by an interprocesses communication.

The building step 707 may include a searching process. When software module is traversing child object 540 of FIG. 5A, software module may use part_number 543 to reference 570 that uses the same part_number as a key. The search permits software module to locate a field in the bicycle wheel delta component part change table 570 of FIG. 5B, that has changed the code or current code is "fourteen inch" 596. The old_code that is now deprecated by the event is "thirteen inch" 597 of FIG. 5A. Thus, in the build step 707, software module may write child containment 425 of FIG. 4B to show the data available through the child business object 540 of FIG. 5A and its supporting change table.

Thus, one or more embodiments of the present invention may summarize changes or deltas in a business object. In addition, a delta business object may represent the interrelationships among objects. Furthermore, a software module may automatically transmit or otherwise propagate such delta business objects to one or more clients that may exist outside the enterprise information system where the software module may reside.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing data, the computer implemented method comprising:
    maintaining a main event component in a first enterprise information system, wherein the main event component is a data structure containing a set of detected events comprising one or more detected events, in which each detected event has a unique event identifier to form a set of unique event identifiers, and a top-level business component of a parent child hierarchy, wherein the top-level business component is associated with one detected event in the set of detected events, and the main event component is indexed by the set of unique event identifiers; and
    associating one of the set of detected events with at least one component of interest to form a delta business object, wherein the delta business object is used to propagate changes to a second enterprise information system.

2. The computer implemented method of claim 1, wherein the maintaining step comprises:
    creating the main event component;
    creating a top-level delta component;
    determining that an event has occurred; and
    recording the event as the detected event to the main event component.

3. The computer implemented method of claim 2, wherein the top-level delta component has a child delta component, and the top-level delta component and the child delta component have a common event identifier.

4. The computer implemented method of claim 2, wherein the associating step comprises:
    identifying a hierarchy of objects including the at least one component of interest; and
    creating the delta business object based on changes in the at least one component of interest.

5. The computer implemented method of claim 4, further comprising:
    sending the delta business object to a client, wherein the delta business object comprises at least one delta field value.

6. The computer implemented method of claim 5, wherein the identifying step comprises:
    determining whether the delta business object has at least one child object; and
    searching a plurality of objects for a child delta component based on a determination that the delta business object has at least one child object.

7. The computer implemented method of claim 6, wherein creating the top-level delta component comprises:
    creating the at least one child delta component.

8. A computer program product for managing data, the computer program product comprising:
    a computer usable memory having computer usable program code-tangibly embodied therein, said computer usable program code including:
    computer usable program code for maintaining a main event component for a first enterprise information system, wherein the main event component is a data structure containing a set of detected events comprising one or more detected events, in which each detected event has a unique event identifier to form a set of unique event identifiers, and a top-level business component of a parent child hierarchy, wherein the top-level business component is associated with one detected event in the set of detected events, and the main event component is indexed by the set of unique event identifiers; and
    computer usable program code for associating one of the set of detected events with at least one component of interest to form a delta business object, wherein the delta business object is used to propagate changes to a second enterprise information system.

9. The computer program product of claim 8, wherein the computer usable program code for maintaining comprises:
    computer usable program code for creating the main event component;
    computer usable program code for creating a top-level delta component;
    computer usable program code for determining that an event has occurred; and
    computer usable program code for recording the event as the detected event to the main event component.

10. The computer program product of claim 9, wherein the top-level delta component has a child delta component, and the top-level delta component and the child delta component have a common event identifier.

11. The computer program product of claim 9, wherein the computer usable program code for associating comprises:
    computer usable program code for identifying a hierarchy of objects including the at least one component of interest; and
    computer usable program code for creating the delta business object based on changes in the at least one component of interest.

12. The computer program product of claim 11, further comprising:
    computer usable program code for sending the delta business object to a client, wherein the delta business object comprises at least one delta field value.

13. The computer program product of claim 12, wherein the computer usable program code for identifying comprises:
    computer usable program code for determining whether the delta business object has at least one child object; and
    computer usable program code for searching a plurality of objects for a child delta component based on a determination that the delta business object has at least one child object.

14. The computer program product of claim 13, wherein computer usable program code for creating the top-level delta component comprises:
    computer usable program code for creating at least one child delta component.

15. A data processing system comprising:
    a bus;
    a storage device connected to the bus, wherein computer usable code is located in the storage device;
    a communication unit connected to the bus;
    a processing unit connected to the bus, wherein the processing unit executes the computer usable code to maintain a main event component for a first enterprise information system, wherein the main event component is a data structure containing a set of detected events comprising one or more detected events, in which each detected event has a unique event identifier to form a set of unique event identifiers, and a top-level business component of a parent child hierarchy, wherein the top-level business component is associated with one detected event in the set of detected events, and the main event component is indexed by the set of unique event identifiers; and to associate one of the set of detected events with at least one component of interest to form a delta business object, wherein the delta business object is used to propagate changes to a second enterprise information system.

16. The data processing system of claim 15 wherein in executing the computer usable code to maintain the main event component, the processing unit further executes the computer usable code to create the main event component; create a top-level delta component; determine that an event has occurred; and record the event as the detected event to the main event component.

17. The data processing system of claim 16, wherein the top-level delta component has at least one child delta component, and the top-level delta component and the child delta component have a common event identifier.

18. The data processing system of claim 16 wherein in executing the computer usable code to associate one of the set of detected events with at least one component of interest to form a delta business object, the processing unit further executes the computer usable code to identify a hierarchy of objects including the at least one component of interest; and to create the delta business object based on changes in the at least one component of interest.

19. The data processing system of claim 18, wherein the processing unit further executes the computer usable code to send the delta business object to a client, wherein the delta business object comprises at least one delta field value.

20. The data processing system of claim 19 wherein in executing the computer usable code to identify a hierarchy of objects including the at least one component of interest, the processing unit further executes the computer usable code to determine whether the delta business object has at least one child object; and to search a plurality of objects for a child delta component based on a determination that the delta business object has at least one child object.

* * * * *